US008925712B2

(12) United States Patent
Dunn (10) Patent No.: US 8,925,712 B2
(45) Date of Patent: Jan. 6, 2015

(54) FOLDING MECHANISM WITH LOCKING FUNCTION (71) Applicant: Gordon Dunn, Omagh (GB)

(72) Inventor: Gordon Dunn, Omagh (GB)

(73) Assignee: Terex GB Limited, Dungannon, County Tyrone (GB)

( * ) Notice: Subject to any disclaimer, the term of this patent is extended or adjusted under 35 U.S.C. 154(b) by 55 days.

(21) Appl. No.: 13/895,551

(22) Filed: May 16, 2013

(65) Prior Publication Data
US 2013/0306437 A1 Nov. 21, 2013

(30) Foreign Application Priority Data

May 18, 2012 (GB) .................... 1208778.9

(51) Int. Cl.
B65G 21/10 (2006.01)
B60P 1/28 (2006.01)
B60P 1/26 (2006.01)
B60J 7/16 (2006.01)

(52) U.S. Cl.
CPC ............. B65G 21/10 (2013.01); B60P 1/286 (2013.01); B60P 1/26 (2013.01); B60J 7/1621 (2013.01)
USPC ............. 198/632; 198/861.1; 16/259; 16/292

(58) Field of Classification Search
USPC ............. 198/313, 632, 861.1, 818, 820, 822; 16/254, 259, 258, 271, 284, 292
See application file for complete search history.

(56) References Cited

U.S. PATENT DOCUMENTS

| 326,801 | A | * | 9/1885 | Sprague | 198/632 |
| 762,979 | A | * | 6/1904 | Berns | 198/632 |
| 4,756,402 | A | * | 7/1988 | Bevins | 198/632 |
| 4,932,516 | A | * | 6/1990 | Andersson | 198/823 |
| 6,705,449 | B2 | * | 3/2004 | Wagstaffe | 198/313 |
| 6,910,586 | B2 | * | 6/2005 | McCloskey | 209/241 |
| 7,347,311 | B2 | * | 3/2008 | Rudge | 198/313 |
| 2008/0041984 | A1 | | 2/2008 | Sauser et al. | |
| 2008/0100087 | A1 | | 5/2008 | Terhaar et al. | |

FOREIGN PATENT DOCUMENTS

DE 19816009 A1 10/1999

* cited by examiner

*Primary Examiner* — James R Bidwell
(74) *Attorney, Agent, or Firm* — Burns & Levinson LLP; Jacob N. Erlich; Marlo Schepper Grolnic (57) ABSTRACT A folding mechanism for a hopper flare, the mechanism comprising a linkage mechanism having a first track provided on a first support, a second track provided on a second support, and a link coupled to both the first and second tracks. The link is capable of riding simultaneously along each of the first and second tracks as the second support pivots about its pivot axis. The first track includes a locking track segment having a bearing surface oriented to resist, by engagement with the link, movement of the second support about the pivot axis in at least one direction.

28 Claims, 6 Drawing Sheets

FOLDING MECHANISM WITH LOCKING FUNCTION

CROSS-REFERENCE TO RELATED APPLICATIONS

This application claims priority to Great Britain Patent Application No. 1208778.9 filed on May 18, 2012, the contents of which are hereby incorporated by reference in their entirety and for all purposes.

FIELD OF THE INVENTION

The present invention relates to lockable folding mechanisms, especially but not exclusively for use with foldable or otherwise movable components of aggregate or other material processing apparatus. The invention relates particularly but not exclusively to lockable folding mechanisms for foldable hopper flares.

BACKGROUND TO THE INVENTION

Aggregate processing apparatus may include foldable components, such as conveyors and hopper flares, that are folded during transport in order to reduce the overall dimensions of the apparatus. It is desirable to lock such components in their deployed and/or transport states. Typically, locking is achieved by manually inserting a wedge into a suitable crevice.

It would be desirable to provide an improved lockable folding mechanism particularly, but not exclusively, for use with foldable or movable components of aggregate or other material processing apparatus, especially hopper flares.

SUMMARY OF THE INVENTION

A first aspect of the invention provides a folding mechanism comprising a first support; a second support pivotably coupled to the first support; an actuator operable to pivot said second support relative to said first support about a pivot axis; and a linkage mechanism coupling said actuator to said first and second supports, wherein said linkage mechanism comprises a first track provided on said first support; a second track provided on said second support; and a link member coupled to both said first and second tracks such that it is capable of riding simultaneously along each of said first and second tracks as said second support pivots about said pivot axis, and wherein said first track includes at least one locking track segment having at least one bearing surface oriented to resist, by engagement with said link member, movement of said second support about said pivot axis in at least one direction.

A second aspect of the invention provides a material processing apparatus comprising at least one foldable component being foldable by at least one folding mechanism of the first aspect of the invention.

A third aspect of the invention provides a hopper for a material processing apparatus, said hopper comprising at least one foldable flare and at least one folding mechanism of the first aspect of the invention for folding said at least one foldable flare.

Preferred features are recited in the dependent claims. Further advantageous aspects of the invention will become apparent to those ordinarily skilled in the art upon review of the following description of a preferred embodiment and with reference to the accompanying drawings.

BRIEF DESCRIPTION OF THE DRAWINGS

Embodiments of the invention are now described by way of example and with reference to the accompanying drawings in which like numerals are used to indicate like parts and in which.

DETAILED DESCRIPTION OF THE DRAWINGS

Figure 1:
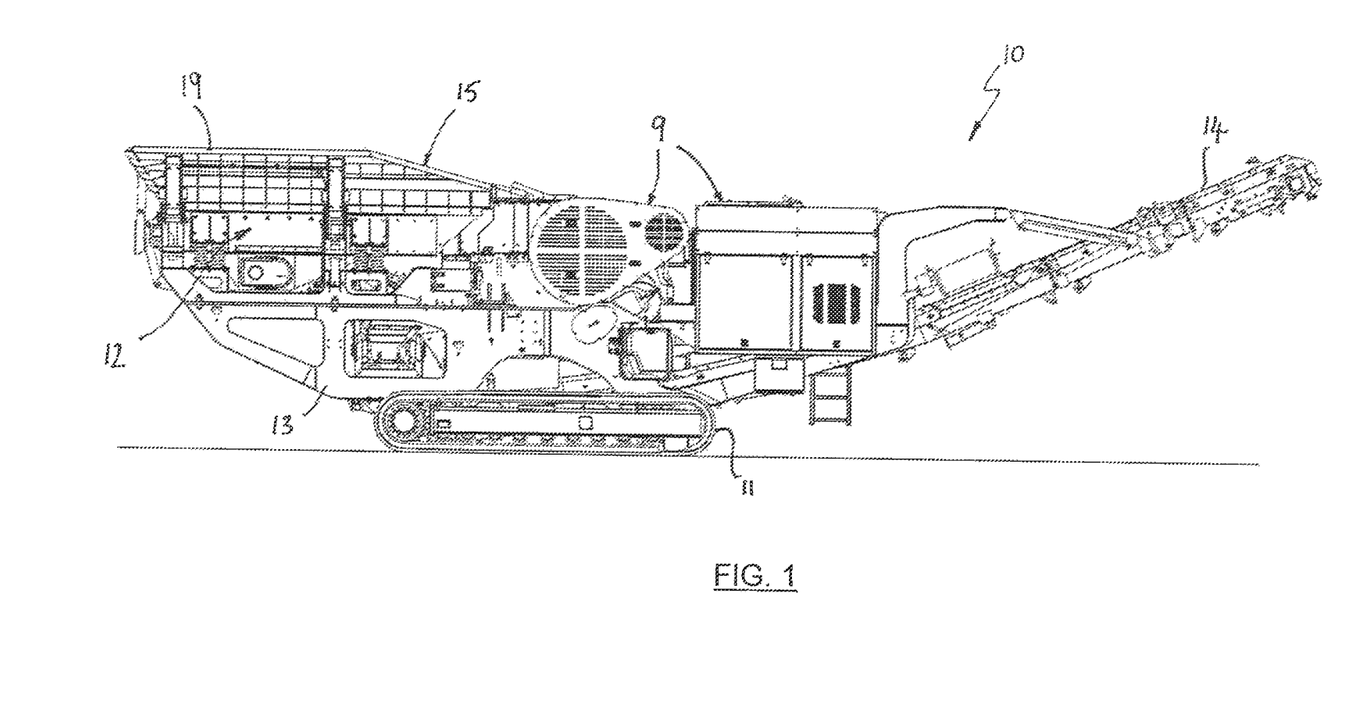
FIG. 1 is a side view of an aggregate processing apparatus including at least one instance of a lockable folding mechanism embodying one aspect of the invention.

Referring now in particular to FIG. 1 of the drawings, there is shown, generally indicated as 10, a material processing apparatus. The material processing apparatus 10 is configured for performing, by way of example, material screening and, as such, comprises a materials processing plant (not visible), e.g. a screening plant or crushing plant. More generally, the apparatus 10 may be configured to perform one or more of a plurality of processes, such as feeding, screening, separating, crushing, waste recycling or demolition and/or washing, on one or more types of aggregate or other material, for example rocks, stones, gravel, sand and/or soil, or any other material that is quarried, mined or excavated. To this end, the apparatus 10 may include one or more material processing plants adapted to perform one or more of the foregoing processes.

Typically, the material processing apparatus 10 is mobile and comprises one or more wheels and/or tracks 11 mounted on a chassis 13. The apparatus 10 is usually self-propelled and to this end may comprise a drive system (not shown), e.g. comprising an engine or electrical power plant, for driving the wheels/tracks 11. In any event, the apparatus 10 may include a power plant 9, which may comprise at least some components of the drive system and/or other apparatus for powering the apparatus, e.g. electrical, hydraulic and/or pneumatic apparatus for powering rams.

The material processing apparatus 10 includes a conveyor 14 for transporting aggregate material or other material from the apparatus 10. Optionally one or more other additional conveyors (not shown) may also be provided for this purpose. A feed apparatus 12 comprises a hopper 15 which in this example is located above a vibratory feeder 12A. The conveyor 14 is usually a belt-type conveyor. Typically, the conveyor 14 is configurable to adopt a transport (folded) state and a use (deployed) state, the deployed state being depicted in FIG. 1. It will be understood that the invention is not limited to apparatus of the type shown in FIG. 1, and may for example be used with other configurations of material processing plant(s) and/or conveyor(s).

Figure 2:
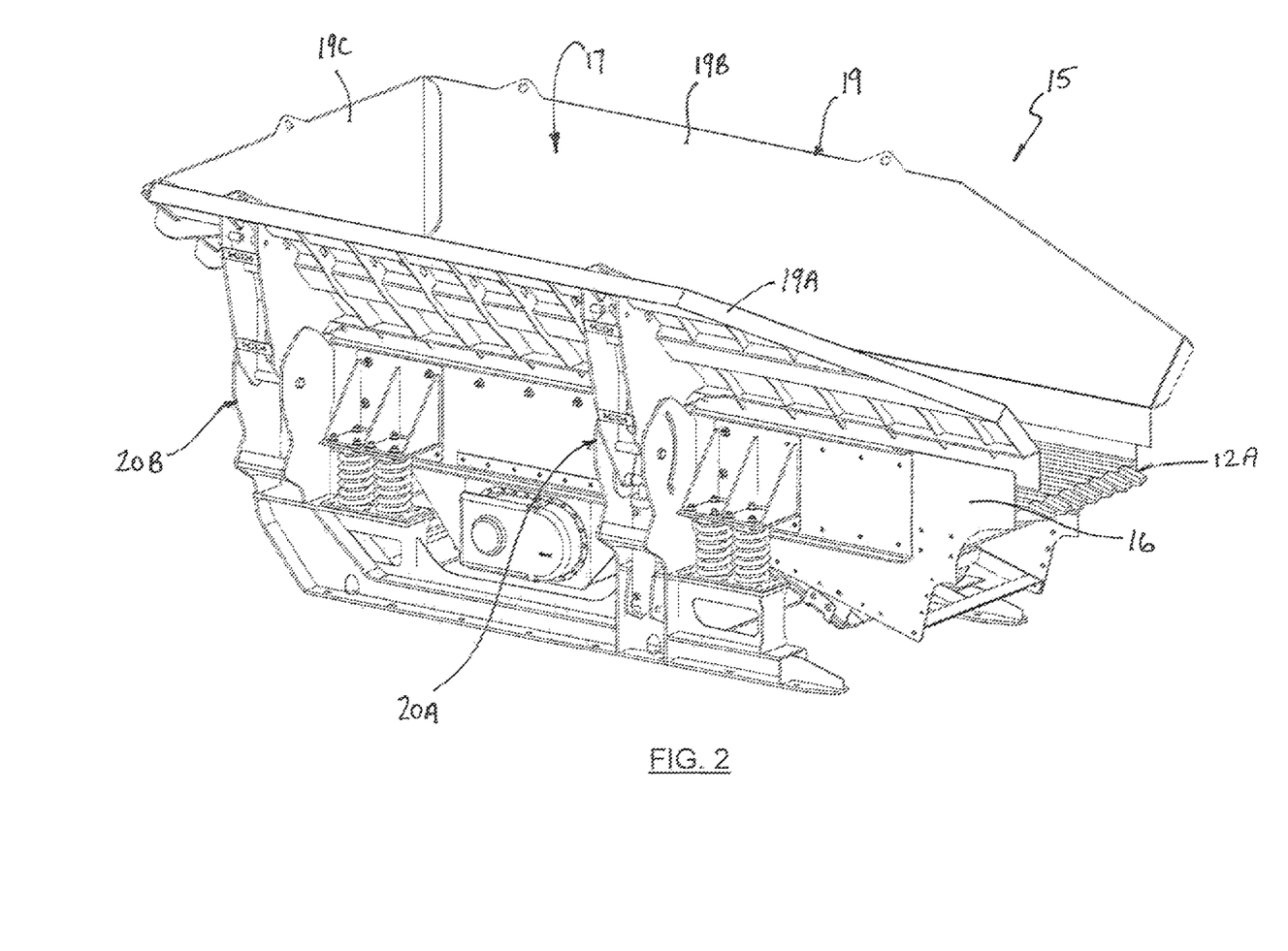
FIG. 2 is a perspective view of a hopper of the apparatus of FIG. 1 including at least one instance of said lockable folding mechanism.

FIG. 2 shows the hopper 15 in more detail. Typically, the hopper 15 is shaped to define a mouth 17 and comprises a wall 19 arranged to guide material (not shown) into the mouth 17 when in a use state (as shown in FIGS. 1 and 2). Typically, there is a respective wall section 19A, 19B at each side of the hopper 15 and at least one end (19C) of the hopper 15. When deployed, the wall 19 extends at least partially around the mouth 17. In the use state, the wall sections 19A-C extend upwardly from the mouth 17, and preferably also extend laterally away from the hopper 15. The wall sections 19A-C are commonly referred to as flares.

In the use state, the height of the flares 19A-C can be problematic when transporting the apparatus 10. Each flare 19A-C is therefore operable to adopt a non-use, or transport, state in which it extends downwardly with respect to the mouth 17. Conveniently, this is achieved by configuring the flares 19A-C to fold with respect to the hopper 15, typically by means of one or more folding mechanism. In the transport state (FIGS. 3C and 4C) the flares 19A-C extend alongside a respective side or end of the apparatus 10, and are typically substantially parallel with the respective side or end. Advantageously, the flares 19A-C are located close, e.g. substantially against or substantially parallel with, the body 16 of the hopper 16 at the respective side or end when folded to minimize the overall dimensions of the apparatus 10.

For example, flare 19A is coupled to the hopper 15 by folding mechanisms 20A, 20B which are configured to allow the flare 19A to fold with respect to the hopper body 16 between the deployed and transport states. More generally, depending on the size of the flares, one or more folding mechanisms may be used for this purpose. One or more respective folding mechanisms (not visible) may similarly be provided for each other flare 19B, 19C.

Folding mechanism 20A is a lockable folding mechanism embodying one aspect of the present invention and is shown in more detail in FIGS. 3A-3C, 4A-C and 5. The folding mechanism 20A comprises first and second supports 23, 25 pivotably coupled to one another. The supports 23, 25 may take any suitable form, typically comprising a post, frame, beam or other structure. Typically, in use, one of the supports 23 (hereinafter the base support 23) serves as a base with respect to which the other support 25 (hereinafter the pivot support 25) can pivot.

In the illustrated embodiment, the base support 23 is fixed with respect to the hopper body 16. For example it may be mounted on, fixed to, carried by or otherwise coupled to the hopper body 16 and/or other part, e.g. beam 17, of the apparatus 10. More generally, the base support 23 may be fixed to any suitable base structure, the pivot support 25 then being pivotable with respect to the base structure.

The pivot support 25 is coupled to the object that it is desired to fold. In the illustrated embodiment, pivot support 25 is fixed to the flare 19A, a part of which is shown in FIGS. 3A to 4C.

The supports 23, 25 are pivotably coupled to one another at a pivot axis P. For example, the pivot coupling may comprise a pivot pin 27 passing through respective apertures 28, 30 formed in each of the supports 23, 25.

Figures 3A, 3B:
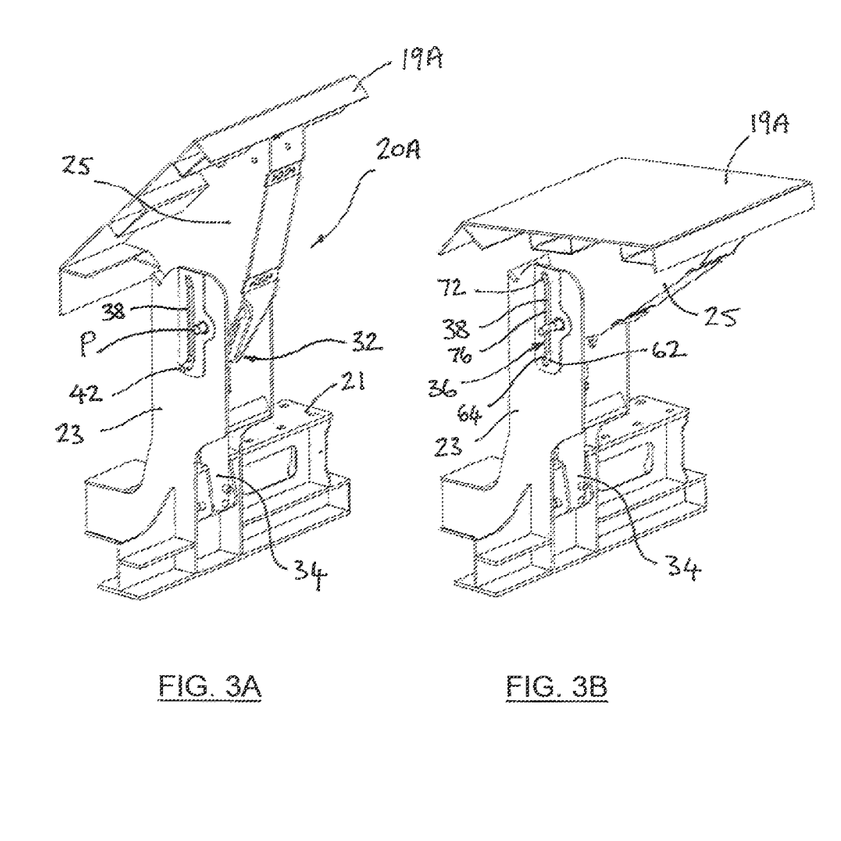
FIGS. 3A to 3C are perspective views of said lockable folding mechanism shown respectively in an unfolded state, an intermediate state and a folded state.
Figure 3C:
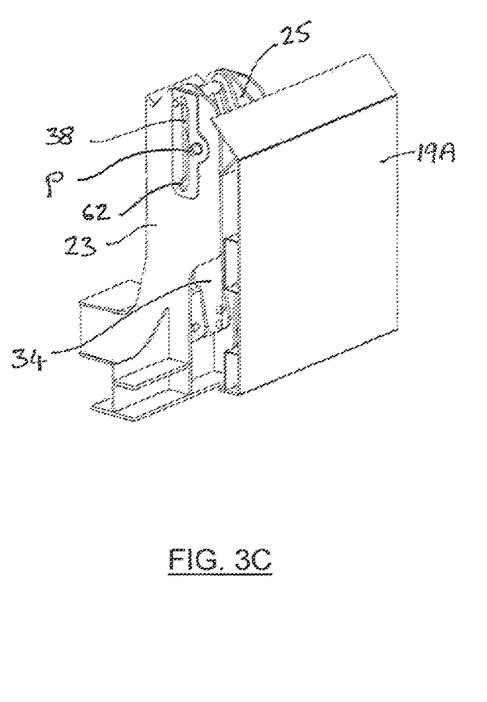

In FIGS. 3A and 3C, the folding mechanism 20A, and more particularly the pivot support 25, is shown in a non-folded state and a folded state respectively. FIG. 3B shows the folding mechanism 20A, and more particularly the pivot support 25, in an intermediate (or partially folded) state between the non-folded and folded states. It will be apparent that the pivot support 25 adopts a series of successive intermediate, or partially folded) states as it moves between the non-folded and folded states, of which FIG. 3B illustrates just one. In the illustrated embodiment, the non-folded state corresponds to the flare 19A being in its use or deployed state, while the folded state corresponds to the flare 19A being in its non-use or transport state.

An actuating system 32 is provided for moving the folding mechanism 20A between the non-folded and folded states. The actuating system comprises an actuator 34 coupled to the supports 23, 25 by a linkage mechanism 36. In use, the actuator 34 imparts movement to the pivot support 25 via the linkage 36 causing the support 25 to pivot about pivot axis P. Advantageously, the linkage 36 is configured to lock the pivot support 25 at least in its non-folded state as is described in more detail hereinafter.

The preferred linkage mechanism 36 comprises a first track 38 provided on the base support 23, a second track 40 provided on the pivot support 25 and a link member 42. The link member 42, which conveniently comprises a pin, is coupled to both tracks 38, 40 such that it is capable of riding simultaneously in each. One or both tracks 38, 40 may conveniently comprise a slot formed in the respective support 23, 25. Conveniently, the linkage mechanism 36 is located in a region of the folding mechanism 20A where the supports 23, 25 overlap and where, typically, pivot axis P is located. In the illustrated embodiment, the base support 23 comprises spaced apart walls 24 and the pivot support 25 is located between the walls 24 in the region of overlap. In this case, the track 40 of the pivot support 25 comprises a through-slot through which the link 42 passes.

In the illustrated embodiment, the track 38 of the base support 23 also comprises a through-slot, although it may alternatively comprise a blind-slot or groove. Track 38 comprises respective matching and aligned parts 38A, 38B (slots in this example), one on each wall 24 of the base support 23. The link 42 has a respective end 44, 46 seated in a respective part 38A, 38B of track 38 and passes through track 40. In the illustrated embodiment, pivot support 25 comprises spaced apart walls 22 and track 40 comprises respective matching and aligned parts 40A, 40B (slots in this example), one on each wall 22 of the base support 25.

In alternative embodiments, one or both of the tracks 38, 40 may comprise only one part, e.g. one slot or groove, or more than two. One or both of the supports 23, 25 need not necessarily comprise spaced-apart walls. For example, the supports 23, 25 may comprise single-walled or otherwise unitary (e.g. solid or box-section) components, located side-by-side in the region of overlap and each comprising a respective single track.

The actuator 34 is coupled between the base support 23 and the link 42. The arrangement is such that, in use, the actuator 34 acts on the link 42, imparting movement to the pivot support 25 via the interaction between the link 42 and the tracks 38, 40. Any suitable actuating device or mechanism may serve as the actuator. The preferred actuator 34 comprises a linear actuator, e.g. a ram, preferably double-acting. In preferred embodiments, the actuator 34 is powered, typically hydraulically powered but any other convenient power means, e.g. pneumatic or electric power means, may be used. In other embodiments, resilient biasing means, e.g. one or more springs, may be used to power the actuator causing it to extend and/or retract. A combination of more than one power means may be employed, e.g. where the actuator is single acting, resilient biasing means being used to perform one of retracting or extending the actuator while another power means is used to perform the other.

Conveniently, one end 48 of the actuator is coupled to the base support 23, the other end 50 being coupled to the link 42. Where the actuator 34 comprises a ram or similar device, the link 42 may be connected to the actuator 34 by an eye 52 located at the end of the piston rod 54. Advantageously, the coupling of the actuator 34 to the base support 23 is pivotable, i.e. such that it allows the actuator 34 to pivot with respect to the base support 23, typically from the end 48. In the illustrated embodiment, the actuator 34 is coupled to the base support 23 by a pivot pin 56. Conveniently, the pivot axis of the actuator 34 is substantially parallel with the longitudinal axis of the link 42, The base support 23 is fixed, i.e. does not move as part of the folding operation and is not movable by the actuator 34. Hence, the track 38 is similarly fixed. As such, the track 38 serves as a guide for movement of the link 42. When the actuator 34 acts on the link 42, which in preferred embodiments involves extension or retraction of the piston rod 54 (or other linearly moving component as applicable), the link 42 rides correspondingly along the track 38. In the illustrated embodiment, extension of the actuator 34 causes the link 42 to move upwards (as viewed) along the track 38, while retraction of the actuator 34 causes the link 42 to move downwards (as viewed) along the track 38. The link 42 imparts movement to the pivot support 25 via the track 40 as it moves along the track 38, in particular pivoting movement about pivot axis P. As the pivot support 25 pivots, the position of the link 42 in the track 40 changes and this allows substantially linear movement of the link 42 to cause pivoting movement of the pivot support 25.

Figures 4A, 4B:
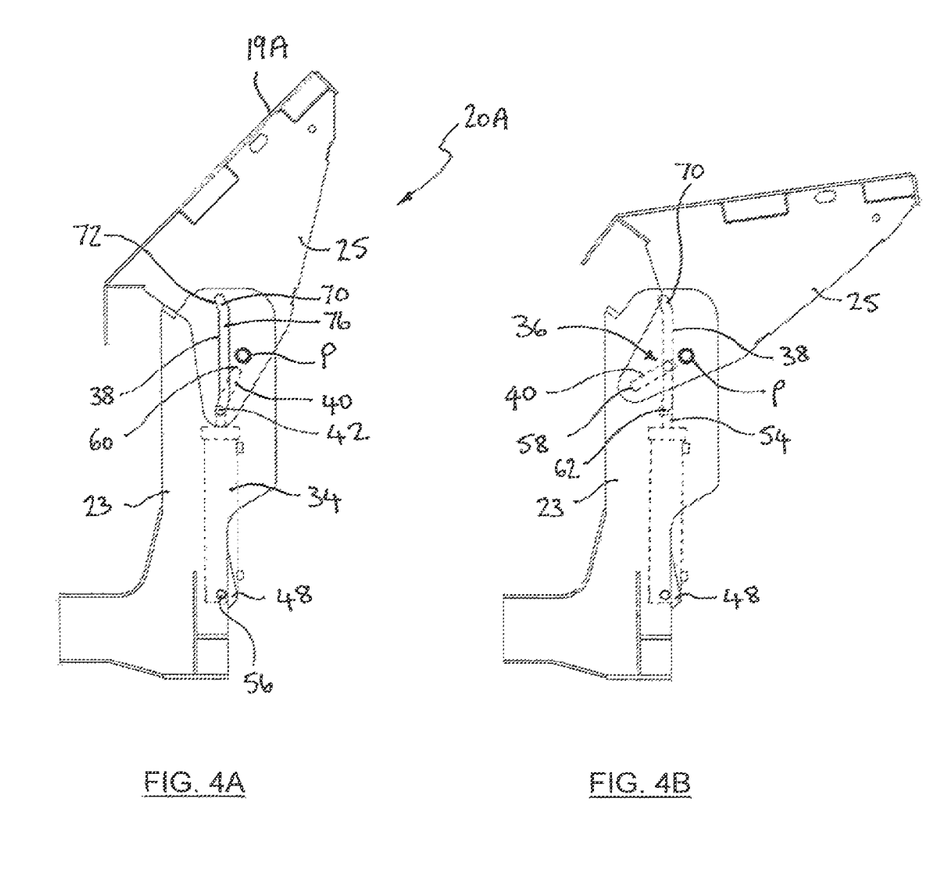
FIGS. 4A to 4C are side views of said lockable folding mechanism shown respectively in the unfolded state, intermediate state and folded state of FIGS. 3A to 3C.
Figure 4C:
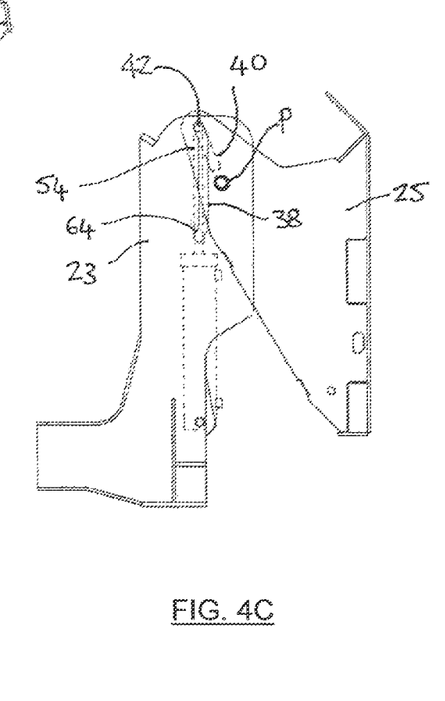
Figure 5:
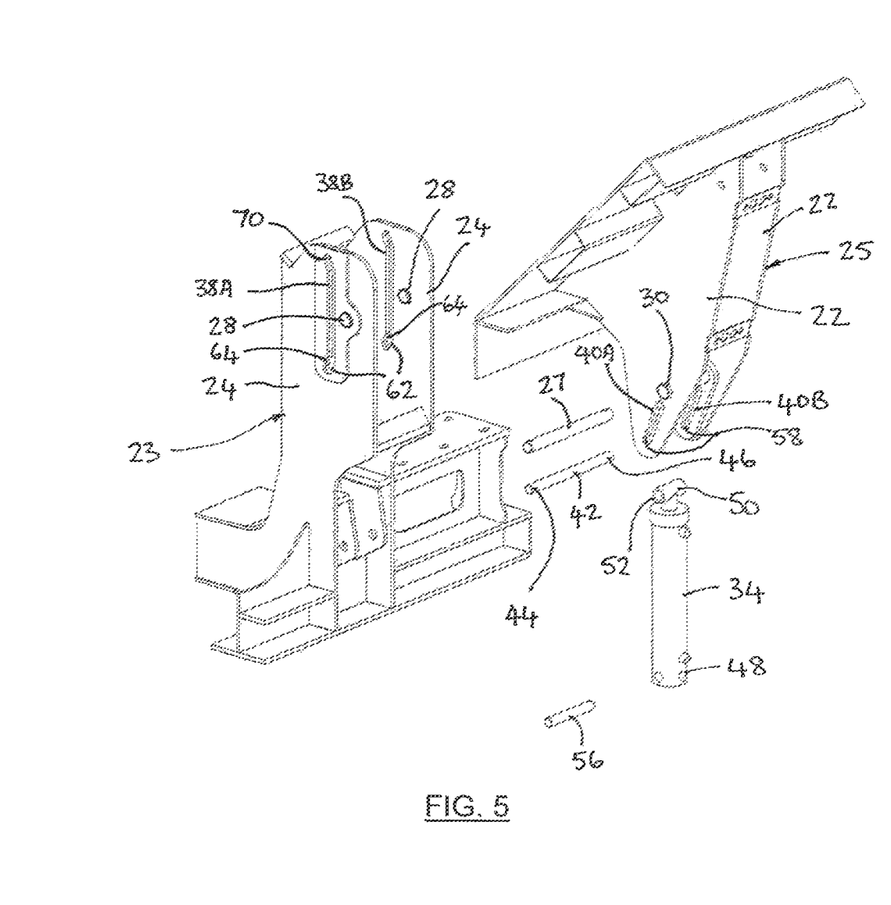
FIG. 5 is an exploded perspective view of the lockable folding mechanism of FIGS. 3A to 4C.

Preferably, track 40 extends substantially radially from pivot axis P and is preferably substantially linear. As can be appreciated from FIGS. 4A to 4C, in use the link 42 travels from a first end 58 of track 40 to the second end 60 and then back to the first end 58 as the pivot support moves from the non-folded state to the folded state, or from the folded state to the non-folded state. In the embodiment of FIG. 4, the second end 60 of the track 40 is located substantially at, or adjacent, the pivot axis P. This assists the transition where the link 42 reaches the end 60 and begins to move back along the track 40 as it facilitates rotation of the track 40 around the link 42 as the pivot support 23 pivots.

In preferred embodiments, track 38 is spaced apart from and extends non radially with respect to the pivot axis P. Typically, the track 38 extends substantially perpendicularly to the pivot axis P.

The respective lengths of the tracks 38, 40 determine the travel of the pivot support 25 between its non-folded and folded states and a selected to suit the application as would be apparent to a skilled person. Similarly, the travel length of the actuator 34 between its extended and retracted states is selected to suit the desired length of the track 38.

The track 38 includes a main segment 76 in which said link 42 runs as the pivot support 25 moves between its folded and non-folded states. In order to provide a locking function, track 38 is shaped to define a locking segment 62. The locking segment 62 is provided at a location in the track 38 where the link 42 is positioned when the pivot support 25 is in its non-folded state, typically at an end of the main segment 76.

The locking segment 62 has a bearing surface 64 against which the link 42 bears under any load that may be applied to the pivot support 25 that tends to cause it to pivot about axis P in a direction towards the folded state. In cases where the centre of gravity of the pivot support 25 (including any object, e.g. flare 19A, to which it is attached) is positioned with respect to the pivot axis (to its right as viewed in FIGS. 3 and 4) so as to tend to cause such pivoting movement, said load may comprise the weight of the support 25 (including any object, e.g. flare 19A, to which it is attached). The locking segment 62 is configured such that the bearing surface 64 is oriented to at least resist and preferably prevent movement of the link 42 relative to the track 38 under said load, at least in a direction towards the main segment 76. For example, the locking segment 62 may be configured such that the bearing surface 64 is substantially perpendicular to the direction in which said load tends to cause said link 42 to move. The bearing surface 64 need not necessarily be exactly perpendicular to said direction. For example a deviation of up to approximately 10°, preferably up to approximately 5°, from perpendicular in either direction may be effected. In the preferred embodiment, the locking segment 62 is located at an end of the track 38 and the bearing surface 64 is angled to cause the link 42 to move towards the end of the track 38 away from the main segment 76. This can be achieved by angling the bearing surface 64 to deviate from perpendicular (for example by approximately 5°) to make the bearing surface 64 more acutely oriented with respect to the main segment 76.

Accordingly, when the link 42 is in the segment 62, i.e. when the pivot support 25 is in the non-folded state, the bearing surface 64 has the effect of locking the pivot support 25 in the non-folded state, at least to the extent that it cannot easily be moved towards the folded state under the action of said load. Typically, the segment 62 is located at an end of the track 38. Alternatively, the segment 62 may be provided between the ends of the track 38, in which case the pivot support 25 may be capable of moving beyond the lockable non-folded position described above and illustrated in FIGS. 3A and 4A, in a direction away from the folded state.

Optionally, the track 38 includes a locking segment 70 provided at a location in the track 38 where the link 42 is positioned when the pivot support 25 is in its folded state. The locking segment 70 has a bearing surface 72 against which the link 42 bears under any load that may be applied to the pivot support 25 that tends to cause it to pivot about axis P in a direction towards the non-folded state The locking segment 70 is configured such that the bearing surface 72 is oriented to at least resist and preferably to prevent movement of the link 42 relative to the track 38 under said load, at least in a direction towards the main segment 76. For example, the locking segment 70 may be configured such that the bearing surface 72 is substantially perpendicular to the direction in which said load tends to cause said link 42 to move. The bearing surface 72 need not necessarily be exactly perpendicular to said direction. For example a deviation of up to approximately 10°, preferably up to approximately 5°, from perpendicular in either direction may be effected. In the preferred embodiment, the locking segment 70 is located at an end of the track 38 and the bearing surface 72 is angled to cause the link 42 to move towards the end of the track 38 away from the main segment 76. This can be achieved by angling the bearing surface 72 to deviate from perpendicular (for example by approximately 5°) to make the bearing surface 72 more acutely oriented with respect to the main segment 76.

Accordingly, when the link 42 is in the segment 70, i.e. when the pivot support 25 is in the folded state, the bearing surface 72 has the effect of locking the pivot support 25 in the folded state, at least to the extent that it cannot be moved towards the non-folded state under the action of said load. Typically, the segment 70 is located at an end of the track 38. Alternatively, the segment 70 may be provided between the ends of the track 38, in which case the pivot support 25 may be capable of moving beyond the lockable folded position described above and illustrated in FIGS. 3C and 4C, in a direction away from the non-folded state.

More generally, the track 38 may include one or more locking segments located at and/or between its ends, having at least one bearing surface oriented to at least resist and preferably prevent movement of the pivot support 25 about the pivot axis in at least one direction. The location of the locking segment corresponds to the position in which it is desired to lock the pivot support 25, which may be the non-folded state, the folded state or any other position, e.g. an intermediate or partially folded state. The locking segment may be provided with two opposing and appropriately oriented bearing surfaces may be provided if it is desired to prevent the pivot support 25 from moving in either direction.

In the preferred embodiment, the link 42 is unlocked by the action of the actuator 34, and is facilitated by the ability of the actuator 34 to pivot with respect to the base support 23. For example, in the locked states shown in FIGS. 4A and 4C, extension of the actuator 34 causes the actuator 34 to pivot with respect to the base support 23 about end 48, which facilitates pushing the link 42 out of the respective locking segment 62, 70 and into the adjacent segment 76 of the track 38 whereupon the pivot support 25 is able to pivot towards the folded state or non-folded state respectively under further extension or retraction, respectively, of the actuator 34.

Figures 6A, 6B:
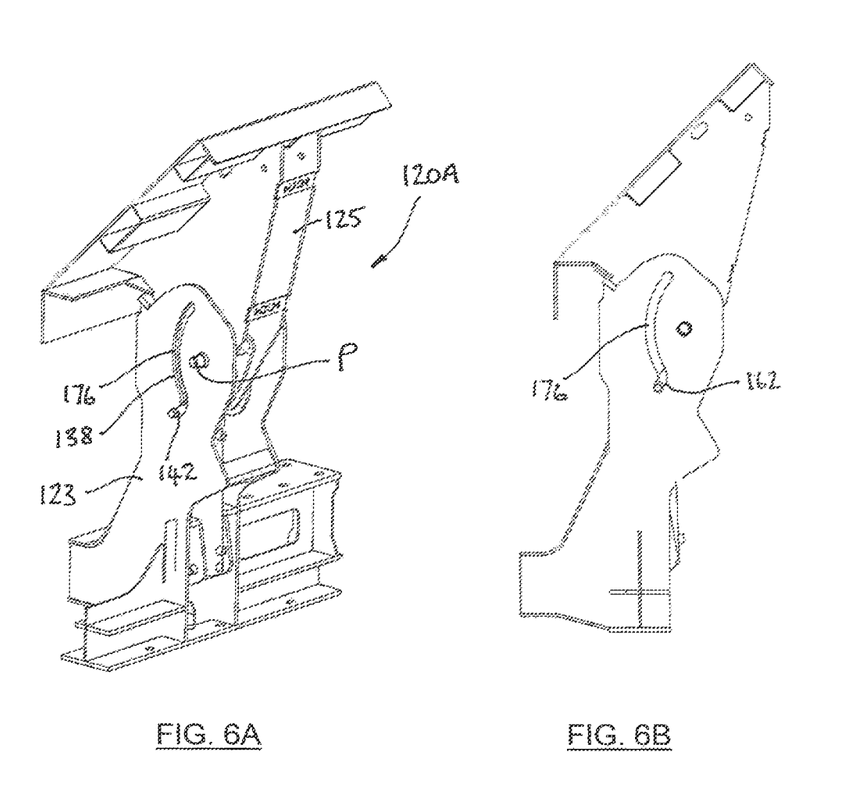
FIG. 6A is a perspective view of an alternative embodiment of a lockable folding mechanism shown in an unfolded state.
FIGS. 6B and 6C show side views of the lockable folding mechanism of FIG. 6A.
Figure 6C:
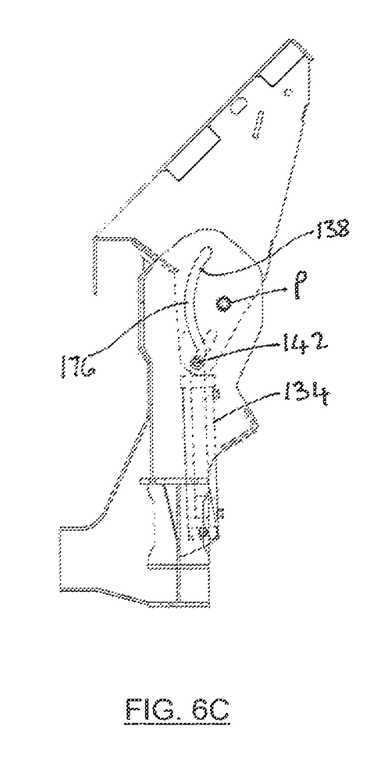

In the embodiment of FIGS. 3 and 4, the track 38 has a main segment 76 that is substantially linear, i.e. the track 38 is substantially linear apart from the locking segments 62, 70. FIGS. 6A to 6C show an alternative embodiment of the folding mechanism, which is similar to the mechanism 20A and so like numerals are used to denote like parts and the same description applies as would be apparent to a skilled person. However, the main segment 176 of the track 138 is curved to be concave with respect to the pivot axis P. This increases the spacing between the track 138 and the pivot axis P (in comparison with the track 38), particularly in the region of the track 138 where the link is substantially level with the pivot axis P, and this decreases the force that the actuator 34 has to apply to pivot the support 25, particularly in the region of the track 138 where the link is substantially level with the pivot axis P. In the embodiment of FIG. 6, the track 138 only has a locking capability in the non-folded state, i.e. by virtue of locking segment 162.

In use, the locking segments 62, 70, 162 provide the folding mechanism with a locking function whereby the pivot support 25, 125 locks in a respective position with respect to the base support 23. When locked, the pivot support 25 is prevented from pivoting about the pivot axis in at least one direction (and optionally both directions if the respective locking segment includes a respective appropriately oriented bearing surface for each direction) when a load or force is applied to the pivot support 25 other that at the link 42, in particular by the actuator 34. The locking function is achieved without the need for separate wedges or other dedicated locking devices.

Referring again to FIGS. 1 and 2, one instance of the folding mechanism 20A embodying the invention is provided for folding the flare 19A. The other folding mechanism 20B is similar to the mechanism 20A, although does not include the locking facility. Alternatively, the mechanism 20B may be the same as the mechanism 20A. Similarly one or more folding mechanisms (not shown) embodying the invention may be provided for flares 19B, 19C.

The invention is not limited to use with hopper flares. For example, one or more folding mechanisms embodying the invention may be used to fold other foldable components of a material processing apparatus, for example a conveyor, ramp, ladder, steps or walkway. The invention is not limited to use with aggregate processing apparatus and may alternatively be used to fold any structure.

The invention is not limited to the embodiments described herein which may be modified or varied without departing from the scope of the invention.

The invention claimed is:

1. A folding mechanism comprising:
a first support;
a second support pivotably coupled to the first support;
an actuator operable to pivot said second support relative to said first support about a pivot axis; and
a linkage mechanism coupling said actuator to said first and second supports, wherein said linkage mechanism comprises:
a first track provided on said first support;
a second track provided on said second support; and
a link member coupled to both said first and second tracks such that it is capable of riding simultaneously along each of said first and second tracks as said second support pivots about said pivot axis; and
wherein said first track includes at least one locking track segment having at least one bearing surface oriented to resist, by engagement with said link member, movement of said second support about said pivot axis in at least one direction.

2. The folding mechanism as claimed in claim 1, wherein said engagement of said link member with said at least one bearing surface prevents movement of said link member along said first track in at least one direction corresponding to said movement of said second support about said pivot axis in said at least one direction.

3. The folding mechanism as claimed in claim 2, wherein said at least one bearing surface is oriented to allow movement of said link member along said first track in a direction opposite to said at least one direction corresponding to movement of said second support about said pivot axis in a direction opposite to said at least one direction.

4. The folding mechanism as claimed in claim 1, wherein said at least one bearing surface is substantially perpendicular to the direction in which said link member is urged in use by movement of said second support about said pivot axis in said at least one direction.

5. The folding mechanism as claimed in claim 4, wherein said at least one bearing surface inclined at up to approximately 10°, preferably up to approximately 5°, to a notional line that is perpendicular to the direction in which said link member is urged in use by movement of said second support about said pivot axis in said at least one direction.

6. The folding mechanism as claimed in claim 1, wherein said at least one locking track segment is located at an end of said first track.

7. The folding mechanism as claimed in claim 6, wherein said at least one bearing surface is oriented to allow movement of said link member towards said end in response to said movement of said second support.

8. The folding mechanism as claimed in claim 1, wherein said first track has a respective locking track segment at each end.

9. The folding mechanism as claimed claim 1, wherein said first track has a main segment along which said link member rides, in use, as said second support pivots about said pivot axis.

10. The folding mechanism as claimed in claim 9, wherein said at least one locking track segment is obliquely disposed with respect to said main segment.

11. The folding mechanism as claimed in claim 9, wherein at least said main segment of said first track is spaced apart from and extends non-radially with respect to said pivot axis.

12. The folding mechanism as claimed in claim 11, wherein at least said main segment of the track extends substantially perpendicularly to the pivot axis.

13. The folding mechanism as claimed in claim 9, wherein at least said main segment is substantially linear.

14. The folding mechanism as claimed in claim 9, wherein at least said main segment is curved and concave with respect to the pivot axis.

15. The folding mechanism as claimed in claim 1, wherein said second support is pivotable between a non-folded state and a folded state, at least one of said bearing surfaces being located at a position in the first track corresponding to the position of said link member in said first track when said second support is in the non-folded state, wherein engagement of said link member with said at least one of said bearing surfaces prevents movement of said second support about said pivot axis out of the non-folded state.

16. The folding mechanism as claimed in claim 1, wherein said second support is pivotable between a non-folded state and a folded state, at least one of said bearing surfaces being located at a position in the first track corresponding to the position of said link member in said first track when said second support is in the folded state, wherein engagement of said link member with said at least one of said bearing surfaces prevents movement of said second support about said pivot axis out of the folded state, 17. The folding mechanism as claimed in claim 1, wherein said second track extends substantially radially from said pivot axis and is preferably substantially linear.

18. The folding mechanism as claimed in claim 1, wherein one or both of said first and second tracks comprise a slot formed in the respective first and second support.

19. The folding mechanism as claimed in claim 1, wherein said linkage mechanism is located a region where the first and second supports overlap.

20. The folding mechanism as claimed in claim 19, wherein said first support comprises spaced apart walls and said pivot support is located between the walls in said region of overlap.

21. The folding mechanism as claimed in claim 1, wherein said actuator is configured to act on said link member to impart movement to said second support via said linkage mechanism.

22. The folding mechanism as claimed in claim 21, wherein said actuator is pivotable with respect to the first support at a location spaced apart from the location where said actuator is coupled to the link member.

23. The folding mechanism as claimed in claim 22, wherein said actuator has one end coupled to said link member and the other end pivotably coupled to said first support.

24. The folding mechanism as claimed in claim 1, wherein said actuator comprises a linear actuator.

25. The folding mechanism as claimed in claim 1, wherein said second support is coupled to a foldable component of a material processing apparatus.

26. The folding mechanism as claimed in claim 25 wherein said foldable component comprises a hopper flare or a conveyor.

27. A material processing apparatus comprising at least one foldable component being foldable by at least one folding mechanism as claimed in claim 1.

28. A hopper for a material processing apparatus, said hopper comprising at least one foldable flare and at least one folding mechanism as claimed in claim 1 for folding said at least one foldable flare.

* * * * *